United States Patent [19]

Hofmann et al.

[11] Patent Number: 4,909,482
[45] Date of Patent: Mar. 20, 1990

[54] VEHICLE WINCH WITH RETRACTABLE HITCH

[75] Inventors: Dietrich A. Hofmann, Kirkwhelpington; Michael E. Norman, Prudhoe; Geoffrey W. O'Connell, Belford, all of United Kingdom

[73] Assignee: Bellway (services) Limited, United Kingdom

[21] Appl. No.: 326,879

[22] Filed: Mar. 21, 1989

Related U.S. Application Data

[63] Continuation-in-part of Ser. No. 119,708, Nov. 12, 1987, abandoned.

[30] Foreign Application Priority Data

Nov. 19, 1986 [GB] United Kingdom ............... 8627684

[51] Int. Cl.[4] .................. B66D 1/12; B66D 1/14; B66D 1/36
[52] U.S. Cl. .................. 254/326; 254/350; 254/362; 280/480.1
[58] Field of Search ............... 254/274, 279, 280, 281, 254/282, 284, 285, 323, 325, 326, 327, 328, 334, 335, 362, 350, 356; 280/477, 480, 491 F

[56] References Cited

U.S. PATENT DOCUMENTS

| | | | |
|---|---|---|---|
| 645,630 | 3/1900 | Schultz et al. | 254/326 |
| 1,323,245 | 12/1919 | Borkes | 254/344 |
| 1,488,286 | 3/1924 | Richter | 254/350 X |
| 1,898,753 | 2/1933 | Wente | 254/362 X |
| 2,459,731 | 1/1949 | Wymore | 280/477 X |
| 3,309,066 | 3/1967 | Carlson et al. | 254/362 X |
| 3,542,398 | 11/1970 | Melroe | 280/480 X |
| 4,185,520 | 1/1980 | Henneman et al. | 254/323 X |
| 4,533,119 | 8/1985 | Liverance et al. | 254/362 X |
| 4,650,163 | 3/1987 | Peterson | 254/327 |

FOREIGN PATENT DOCUMENTS

607196 8/1960 Italy .

Primary Examiner—Joseph J. Hail, III
Attorney, Agent, or Firm—Oliff & Berridge

[57] ABSTRACT

The invention relates to a winch for a vehicle which is compact enough to be located at the rear of the vehicle without causing due limitation to the cross country ability of the vehicle and yet at the same time, provides a reliable winch for drawing a vehicle to be towed to it and enabling the coupling member to be physically secured to the vehicle when the cable is in the fully wound position. The winch comprises a housing, a drum rotatable about its axis within the housing, a cable having a coupling member at a bitter end thereof, said cable being adapted to wound upon said drum, characterized by the motor being disposed within the drum itself, a guide member being provided for movement relative to the winding surface of the drum for guiding the cable opening in the housing to a winding surface of the drum for lowering the cable thereon during winding without significant bunching of the cable and in that coupling includes a nesting portion which locates a nest in a corresponding cooperating portion carried by or within the housing when the cable is in the fully wound position.

6 Claims, 6 Drawing Sheets

VEHICLE WINCH WITH RETRACTABLE HITCH

This is a continuation-in-part of application Ser. No. 07/119,708, filed Nov. 12, 1987, now abandoned.

BACKGROUND OF THE INVENTION

This invention relates to vehicle winches. Winches for mounting on vehicles are well known and have been used for a large number of purposes, including drawing articles, loads and other vehicles towards the vehicle on which the winch is mounted and also for recovery of the vehicle on which the winch is mounted from situations where the vehicle would otherwise be stranded.

Cross-country vehicles such as Landrovers (Registered Trade Mark) and the like, frequently carry such devices which are mounted on the vehicle in which the winch drum is driven either by a direct drive or power take-off from the engine or alternatively by separate electric motor supplied by the vehicles' electrical system.

Vehicles of this type are frequently used for the purpose of towing other vehicles, such, for example, as trailers, horseboxes, boats and caravans. This tow is usually by means of a tow hitch fixed to the back of a vehicle. On coupling a trailer to the vehicle, it is necessary to back the vehicle to a position such that the tow hitch thereon is juxtaposed the coupling on the trailer. This operation requires considerable skill. It would clearly be much easier to have a situation where the hitch member is demounted or demountable from the towing vehicle and attached to the trailer; the hitch member itself being attached to the bitter end of the winding cable of a winch. Winding of the winch would then draw the trailer into towing relationship with the vehicle thereby effecting coupling of the trailer to the towing vehicle.

Devices of this type are generally known. On most vehicles the winch assembly is located at the rear end with the tow hitch. In other proposals, the winch which is usually a manual winch, has been mounted on the trailer. However the problem that arises is one in which the winch assembly should be compact enough to incorporate the winch drum, the winch motor, the drive gear from the motor to the drum and the necessary hitch assembly without undue projection either rearwardly of the vehicle or downwardly therefrom which latter which would inhibit the cross country capability of the towing vehicle.

A principal problem is that the winch cable is usually wire and this imposes limitations on the size of the drum that can be employed for winding and also provides problems of the quantity of cable that can be accommodated within a given size of housing. In winding such cables it is frequently the case that wraps of cable "bunch" towards one end of the drum to such an extent that the cable jams against the housing accommodating the drum thus causing the winch to stall before the hitch has returned to its datum towing position.

The present Applicants have perceived, therefore, that there is a need for a compact winch unit in which a hitch or coupling assembly at the bitter end of a winding cable is substantially self-locating with respect to the winch housing in the towing position and at the same time winding of the cable can be effected without substantial bunching of the cable thereon.

SUMMARY OF THE INVENTION

According to the present invention, therefore, there is provided a winch for a vehicle comprising a winding cable, a coupling member at the bitter end of said winding cable, a drum rotatable about its axis for winding said cable, a housing accomodating said drum, said housing having an opening for said cable and motor means for driving said drum, characterised in that the motor means is disposed within said drum, a guide member is provided for movement relative to the winding surface of the drum for guiding the cable to the winding surface of the drum for layering the cable thereon during winding without significant bunching of the cable and in that the coupling means includes a nesting portion which locates and nests in a corresponding portion carried by or within said housing when the cable is in the fully wound position.

The guide member may be driven directly or indirectly by the motor means. In one embodiment of the invention, the guide member is driven via the drum. The guide member may be movable in a direction substantially in spaced parallel relationship with the drum axis. The guide member may be carried by a threaded rod with which the guide member engages whereby rotation of the rod produces movement of said guide member therealong. In a preferred embodiment the arrangement is such that one rotation of the drum moves the guide member along the surface of the drum by a distance equivalent to at least one cable width thereby providing an even lay of cable on the drum.

The housing for the winch may be provided with an elongate slot juxtaposed said rod and guide member. Said slot may have a closure such as a flap or a brush strip or strips, the latter serving to clean the cable as it winds in and out.

The motor means may include a gear train and a clutch means and in a particular embodiment the gear train is disposed within the drum. The threaded rod may be driven by engagement with the end flanges of the drum and the end flange of the drum may be toothed to engage with a corresponding tooth pinion provided at the end of the threaded rod. In order to save additional space and weight, the motor may be an electric motor and the stator may be mounted directly within the barrel of the winch drum, thereby eliminating the need for a separate motor housing.

The bitter end of the winding cable may include a coupling member typically a hitch comprising a ball which constitutes a ball portion of a ball-and-socket coupling; the coupling member may include a nesting portion which locates and nests in a corresponding portion carried by or within the housing when the cable is in the fully wound position. Means may be provided for securing the coupling member in its mating position when in its normal towing mode.

It will be appreciated by the man skilled in the art that this device permits the use of an elongate winding drum which is capable of accepting the total length of cable to be wound thereon in a single layer. The electricity supply to the motor may be provided substantially axially of the drum via a commutator to the coils in the motor.

Following is a description by way of example only and with reference to the accompanying informal drawings of methods of carrying the invention into effect.

DESCRIPTION OF THE PREFERRED EMBODIMENTS

Figure 1:
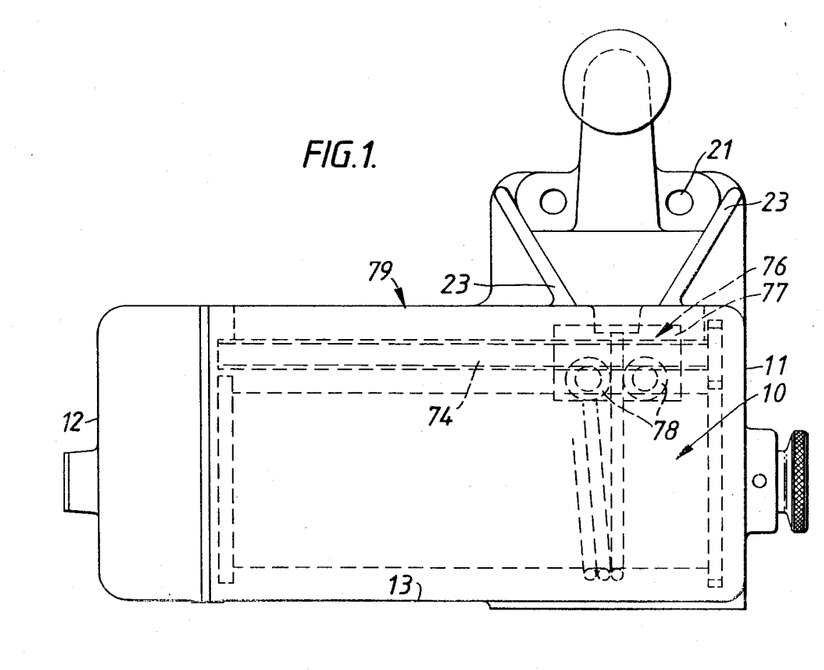
FIG. 1 is a plan view of a winch and tow hitch in accordance with the present invention.
Figure 2:
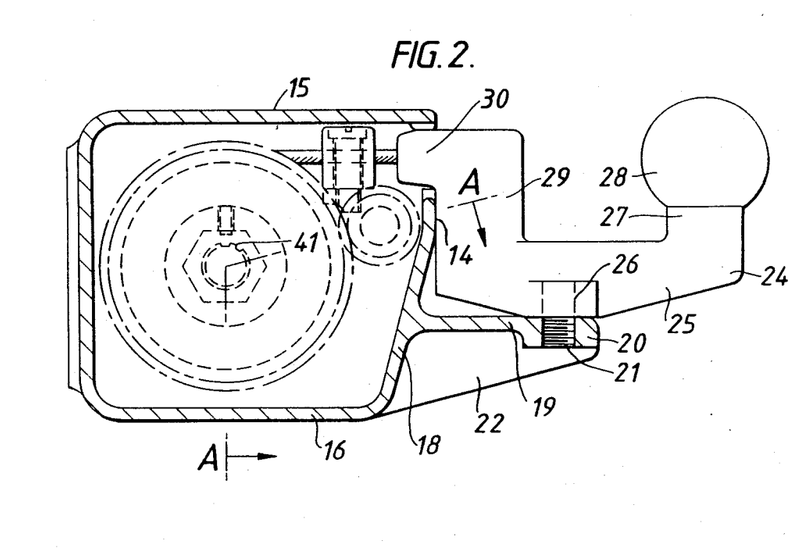
FIG. 2 is a side view partly in section of FIG. 1.

Referring first to FIG. 1 and FIG. 2, the winch has a housing 10 formed of a first end wall 11, a second end wall 12, a forward wall 13, a rear wall 14, an upper wall 15 and a lower wall 16. The housing is provided towards the second end wall 12 with an internal partition 17 extending across the housing and substantially in spaced parallel relationship with end wall 16. The rear wall 14 has a downwardly inclined lower portion 18 which extends from an intermediate point of the rear wall 14 to the junction of the inclined portion of lower wall 16 as shown in FIG. 2; the upper portion of the rear wall 14 having an elongate slot 79 for receiving a winding cable.

Towards the first end wall 11, the downwardly inclined portion 18 has a rearwardly extending platform 19 extending substantially horizontally from the inclined wall 18 and in spaced parallel relationship with top wall 15 and lower wall 16. The rearwardly projecting platform 19 terminates in an enlarged portion 20 having a pair of spaced holes 21 extending therethrough. The platform 19 is provided with a lower reinforcing web 22 and a pair of rearwardly diverging guides 23 on its upper surface. The guides 23 in combination with the rearward platform 19 serve to define a hitch receiving recess adapted to receive a hitch member 24 comprising a base portion 25 having a pair of spaced holes 26 adapted to align with the spaced holes 21 in the enlarged portion of the rearward platform 19, said base portion carrying at its rearward end, an upstanding rearward part 27 terminating in a standard 50 mm ball 28. The forward part of the base portion is upwardly cranked at 29 to define a cable receiving part 30.

Figure 3:
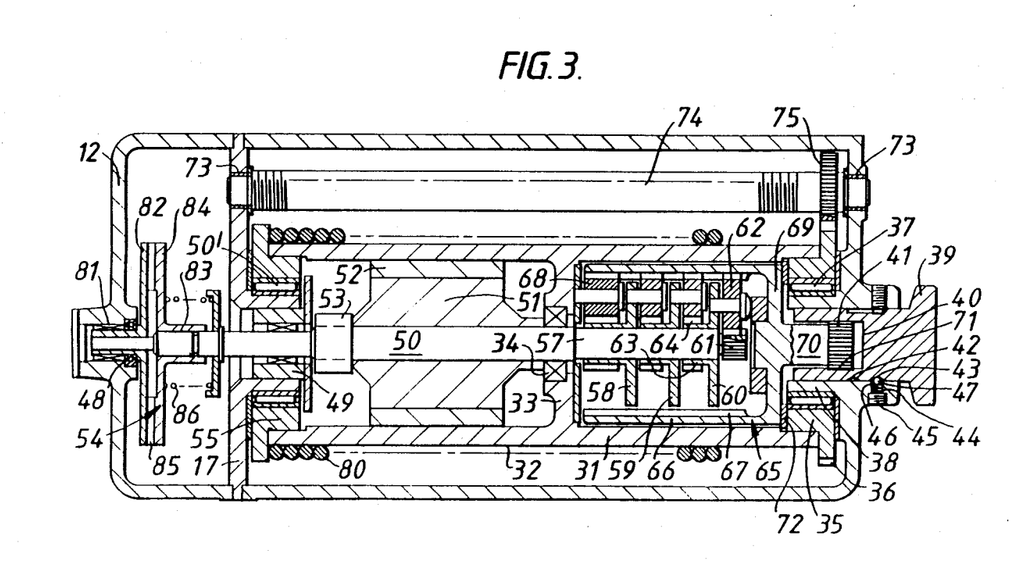
FIG. 3 is a section along the line A—A of FIG. 2.

Turning now to FIG. 3, housing 10 accommodates a longitudinal winch drum barrel 31 having a substantially cylindrical outer surface 32 constituting a cable receiving surface of the drum. The cylindrical barrel is provided with an internal partition wall 33 having an internal bearing 34, the drum is provided at its first end with a flange portion 35, the periphery of which 36, has a plurality of gear teeth provided therein. The flange portion 35 is journalled for rotation by bearing 37 acting on cylindrical bearing surface 38 extending inwardly of the first end wall 11 of housing 10. The bearing surface 38 is defined by a cylindrical portion, the internal surface of which is of hexagonal cross-section; this cylindrical portion extends through the casing to provide a corresponding cylindrical portion externally thereof to form a through bore of hexagonal cross-section for accommodating a clutch member 39.

The clutch member 39 is also of hexagonal cross-section and is a sliding fit in said through bore. Clutch member 39 has a central blind counter bore 40 from its inward end which has a plurality of splines 41 cut in its internal surface. The external cylindrical surface of the bore towards the outer part of cylindrical portion 38 is provided with an inner recess 42 and an outer recess 43. The outer part of cylindrical portion 38 is provided with a radial bore 44 which is threaded towards its radial extremity and receives a set screw 45, an intermediate spring 46 and a ball 47 in which the latter is urged into engagement with one of recesses 42 and 43. The clutch member 39 is slidable between inner and outer positions to engage and disengage motordrive to and from the winch drum barrel 31.

The second end wall 12 is provided with an end bearing 48 while the internal partition 17 is provided with an inwardly directed cylindrical portion 49 substantially coaxial with end bearing 48, cylindrical portion 49 defining on its outer cylindrical surface, a bearing surface for a roller bearing 50'. End bearing 48 and internal bearing 34 together support for rotation thereon, a motor shaft 50, which carries an armature 51, the cores of which are juxtaposed permanent magnets 52 secured to the internal surface of the winch barrel 31 and constituting the stator for the motor. Commutator ring assembly 53 provides the necessary electrical supplies to the armature 51.

The shaft 50 carries at its second end in the compartment defined between partition wall 17 and end wall 12 an overrun brake assembly indicated generally at 54 to provide an overrun braking of the motor in freeload conditions particularly during unwinding of the winch cable.

The overrun device indicated generally at 54, comprises a sprag clutch 81 acting between a clutch plate 82 and housing wall 12 to permit rotation of clutch plate 82 in winding direction of shaft 50 but to lock plate 82 against rotation in the opposite sense. Shaft 50 carries a correspondingly threaded collar 83' capable for rotation therewith. Collar 83' carries for movement therewith a second clutch plate 84 having on its surface an annulus of friction material 85. Second plate 84 is biased into engagement with first plate 82 by means of spring 86, the spring bias being such as to impose a braking torque between surfaces 82 and 85 of only 60-70% of the peak winding torque of the motor.

The winch barrel 31 has at its second end an end plate and flange 55 secured to the second end of the winch barrel 31 defining the second end extremity of the winding surface 32 of winch barrel 31. The end plate 55 is journalled for rotation in bearing 50.

The first end 57 of shaft 50 constitutes the output shaft of the motor and carries three planet gear carriers 58, 59 and 60. Each of said planet carriers being rotatable with respect to shaft end 57. Shaft end 57 terminates at its extremity in a pinion 61 which engages with a planet gear 62 carried by planet carrier 60. Planet carrier 60 comprises a substantially annular element having a central hub 63 which is toothed to form hub or sun gear 64. Each of planet carriers 58 and 59 are similarly constructed. Each of the planet gears carried by each planet carrier 58, 59 and 60 engage with a common ring gear carried by a cylindrical cage 65. Cage 65 comprises a cylindrical portion 66 concentric with shaft end 57, said cylindrical portion 66 carrying on its internal surface a plurality of axially extending teeth 67 adapted to engage the teeth of the planet gears 62 carried by each of carriers 58, 59 and 60 and a further planet gear 68 carried by internal partition wall 33. The cage 65 has an annular end plate 69 carrying a stub axle 70 extending into blind bore 40 of clutch member 39 and terminating in a splined part 71 adapted to engage with the splines 41 carried on the internal cylindrical surface of the blind bore 40 of clutch wheel 39. A thrust bearing 72 is interposed between the annular end face of plate 69 and the juxtaposed surface of the first end flange 35 of winch barrel 31.

The first end wall 11 of housing 10 and the partition wall 17 is provided with a pair of spaced bearings 73 which serve to support and locate a threaded shaft 74 with its axis of rotation in spaced parallel relationship to the axis of rotation of shaft 50. Threaded shaft 74 carries towards its first end a gear 75 which engages with the teeth 36 on end flange 35 so that rotation of the drum results in corresponding rotation of shaft 74 about its axis.

The shaft 74 has mounted thereon a guide member 76 comprising a body portion 77 having a threaded bore therein which engages with shaft 74, the arrangement being such that on rotation of the shaft the body 77 moves axially therealong in response to inter-engagement between the threads on the body portion 77 and corresponding threads on the surface of shaft 74. The body portion 77 carries a pair of guide rollers 78. The end of a wire winding cable 80 enters cable opening 79 in housing 10 and is secured to the second end of winch barrel 31 adjacent or at end flange 55. The cable is wound upon the drum barrel and passes between guide rollers 78 on guide member 76 and out through the cable opening 79 in housing 10, the bitter end of the cable being fixedly secured to cable receiving portion 30 of the upward cranked part 29 of hitch member 24.

In operation with the cable fully wound on the drum and the hitch member 24 in its datum position with the holes 21 in the platform aligned with the corresponding holes 26 in the hitch member, withdrawal of the clutch wheel 39 so that detent 42 engages with ball 47 results in disengagement between spline 71 and 40 thus permitting rotation of the cage 66 in corresponding rotation of the drum barrel 31. Removal of the locking pins from the aligned holes 21 and 26 enables withdrawal of the hitch member 24 from the platform 19. This action results in unwinding of the cable from the drum and as the drum rotates in response to unwinding of the cable 80, corresponding rotation of the shaft 74 is occurs by virtue of the interaction between gear 75 and tooth flange 35 of the drum. Continued withdrawal of the cable results in continued rotation of the shaft 74 with corresponding movement of the guide member 76 along the shaft in response to the unwinding of the cable, with the cable debouching from the housing via elongate slot 79 in juxtaposition member 76. The ratio of the number of teeth on the gear 75 and the teeth 36 on drum flange 35 together with the pitch of the screw on shaft 74 is such that the guide member remains in accurate juxtaposition to the cable being unspooled from the drum.

At its extremity, the hitch member is then engaged with the trailer to be coupled. The clutch member 39 is moved axially inwardly so that splined part thereof engages splined part 71 of cage 65 thus locking the latter to the housing. Operation of the electric motor drives shaft 50 by virtue of remote switch means (not shown). Rotation of the motor shaft 50/57 results in pinion 61 engaging planet wheels 62 which reacts against the ring gear 67 carried by cylindrical cage portion 66. Planet gears 62 move in precession about the axis of shaft 57 and carries with it, its corresponding carrier 60. The hub or sun gear portion 64 of this engage with the next planet gear for planet carrier 59 and produces corresponding relative reactional movement resulting in a progressive reduction in speed until drive is effected from the planet carrier 58 via planet gear 68 through reaction to ring gear 66 to cause rotation of the intermediate wall 33 and of winch barrel 31. This produces corresponding right-ward movement of the guide member 77 (see FIG. 1) to effect winding and laying of the cable on the winch barrel as winding progresses. The gearing of the four-stage planetary gear arrangement illustrated in FIG. 3 provides for the motor assembly in the specific embodiment a rate of rotation of the drum of 11 to 12 revolutions per minute depending upon the load thereon. With the hitch member 24 in the fully located position as shown in FIG. 2, securing pins are entered into the aligned recesses 21, 26 to secure a hitch to the housing and to relieve snatch loads occasioned during towing from the cable 80.

In normal winding of the winch drum spring 86 maintains plates 84 and 82 in torque transmitting relationship so that plate 82 rotates with shaft 50 and sprag clutch 81 "freewheels".

When the motor direction is reversed to unwind the winch cable, the sprag clutch 81 prevents rotation of plate 82. Torque applied by motor 51 to shaft 50 results in collar 83 and friction lining 85 being driven relative to surface 82 allowing slippage to occur and power unwinding to occur the braking effect being overridden by the motor. If the winch cable "overruns", the torque applied by the motor to shaft 50 will be reduced or reversed and the braking of the shaft 50 will occur.

The winch described above is compact and provides spooling means which does not allow bunching of the cable on the drum and the multi-stage epicylic gear system provides adequate speed reduction for the motor without undue frictional losses therein.

Figure 4:
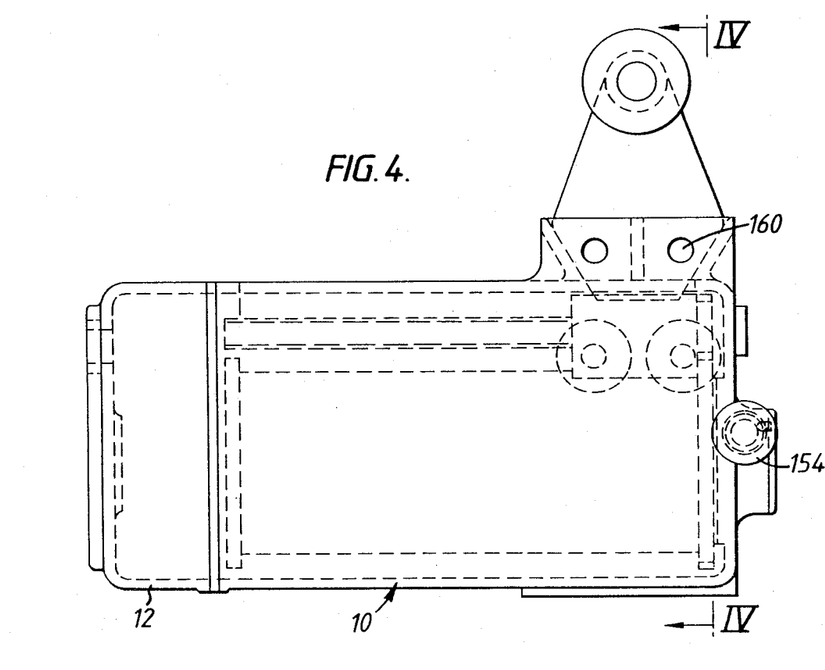
FIG. 4 is a plan view of an alternative embodiment of a winch and tow hitch in acordance with the present invention.
Figure 5:
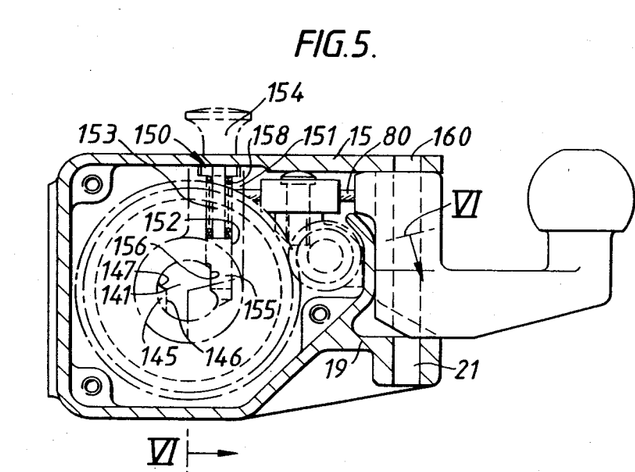
FIG. 5 is a section on line IV—IV of FIG. 4.
Figure 6:
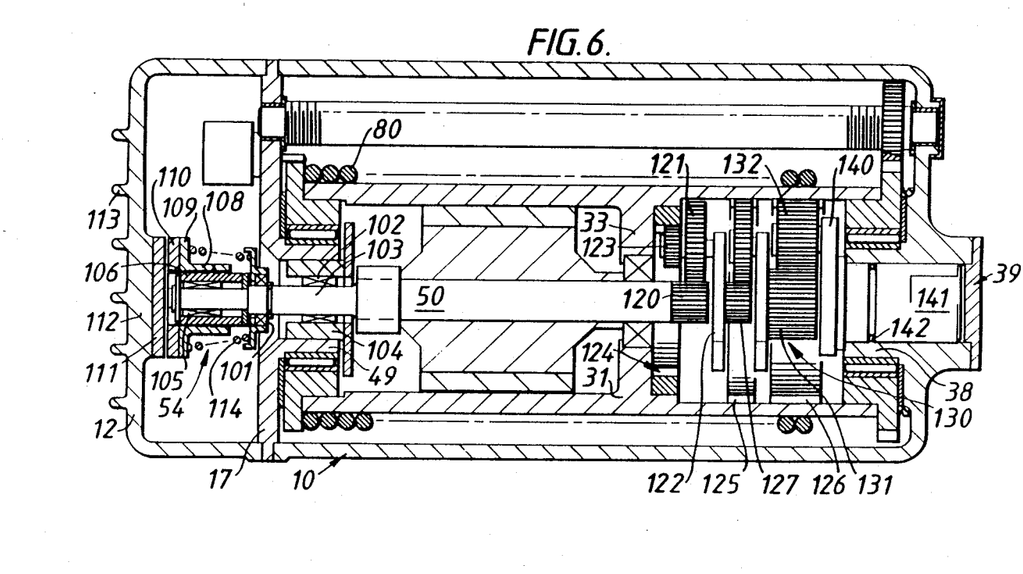
FIG. 6 is a section along VI—VI of FIG. 5.

The embodiment illustrated in FIGS. 4 to 6 of the accompanying drawings is essentially a modification of that described above with reference to FIGS. 1 to 3.

In this embodiment the housing 10 is of a substantially aluminium casting and a modification has been provided to the overrun clutch assembly 54 to provide better heat dissipation facilities therefrom during powered unwinding of the winch. In this embodiment the shaft 50 is provided at its second end with a bearing 102 acting between the shaft end of the extension 103 and an insulating insert 104 which insert is a cylindrical insert carried by cylindrical portion 49. Shaft extension 103 has a sprag clutch 105 mounted towards the extremity thereof. Sprag clutch 105 acts between the shaft extension 103 and a collar 106. Clutch plate 109 carries an annular layer 110 of friction material thereabout adapted to engage with a corresponding plate 111 fixed to an enlarged portion 112 of end wall 12. The loading of annular layer 110 of friction material against surface 111 is such that the braking force is only 60-70% of the peak "lifting" torque of the motor. The external surface of end wall 12 is provided with a plurality of fins 113 to aid the dissipation of heat. The operation of the device is exactly the same as before. Rotation of the shaft 50/103 in a winding direction is accompanied by freewheeling of the sprag clutch 105. Collar 106 remains stationary and a spring 114 urges clutch plate 109 and its associated friction surface 110 into frictional engagement with fixed plate 111. In operation of the motor to reverse the direction of motor shaft 50/103 to effect unwinding of the drum when the torque sprag clutch 105 is engaged and reverse torque on shaft 150/103 is transmitted via sprag clutch 105 to collar 106. Continued application of the torque results in a braking effect between clutch plate 109 and its frictional lining 110 and fixed plate 111. Since the spring loading of the clutch plate 109 is intended to provide only 60-70% of the peak load of the winch, at lighter load than this some positive drive is necessary by the motor to overcome the braking effect and the inherent resistance of the gear train.

In this embodiment the drive gear has been modified by the reduction of the number of epicylic stages from four to three. The drive shaft 50 has been fore shortened and provided with spline end 120, the splines of which constitute the teeth of a drive pinion adapted to engage with a planet gear 121 carried by floating planet carrier 122 (see FIG. 6). Carrier 122 and its associated pinion planet gear 121 carries a smaller planet pinion 123, the teeth of which engage with a ring gear 124 carried for rotation by the internal surface of winch drum 31.

The first end of winch drum 31 is provided with first and second ring gears 125 and 126 cut in the internal surface thereof and drive is transmitted from sun gear 127 of carrier 122 to a second epicyclic stage indicated generally at 130. Sun portion 131 of which is transmitted to star gear 132 to effect final drive of the drum barrel 31 by interaction with ring gear 126. Star gear 132 in normal operation of the assembly is maintained in a stationary mode by means of star carrier 140. The clutch mechanism indicated generally at 39 in FIG. 6 is further modified by the provision of an anti-jamming mechanism indicated at 150 as thereafter described.

When star carrier 140 is locked with housing 10 drive will be transmitted by motor shaft 50 through the epicylic gear system to drum 31. When star carrier 140 is free to rotate about its axis there will be no reaction between sun gear 130 and star gear 132 since star gear 132 will be free to move in precession about sun gear 130 and no torque transmission will take place. This allows freewheeling of the winch drum during unreeling of the cable when not using a motor drive.

Turning now to FIG. 5 the sun carrier 140 has a stub axle 141 journalled for rotation in cylindrical portion 38 and retained therein by means of a circlip 142. The extremity of stub axle 141 is provided in a cylindrical surface with a pair of diametrically opposed cut away portions 145 each of which is defined by a substantially planar surface 146 and an arcuate surface 147 (see FIG. 2). Housing 10 carries at its first end an upstanding cylindrical guide 131 having a central bore 152 adapted to accommodate a substantially vertically disposed plunger 153. The plunger 153 is provided at its upper end with an operating knob 154 and at its lower end with a detent portion 155, the edge of which is cut away at 156 to engage with planar surface 146 of axle end 141. The detent portion 155 is spring loaded by means of compression spring 158 into engagement with the cut away portion 145 in stub axle end 141. In winding of the cable, stub axle 141 moves clockwise when viewed as in FIG. 2. The substantial planar surface 146 engaging with the cooperating planar surface of detent portion 155 of plunger 153 prevents rotation of stub axle 141 and corresponding star carrier 140 with a result that motor drive is transmitted from the motor via the epicyclic gear assembly to the winch drum 31.

To release the motor drive, lifting of the knob 150 disengages detent portion 155 from cutaway part 145 of stub axle 141 with a result that stub axle 141 is free to rotate. An advantage of this device is that in the event that the motor is operated in the unwinding mode and the hitch is not removed from its datum position, the unwinding of the cable 80 within the housing 10 would normally result in the cable jamming against the internal surface of the housing. As reverse torque was applied to stub axle 141 as a result of this operation, arcuate cam surface 147 of cutaway portion 145 would engage the underside of detent path 155 to lift plunger 153 thus disengaging from stub axle 141 and allowing the same to rotate thus breaking momentarily the drive between the motor and the drum until the next cutaway part comes into register with detent portion 155. The cycle of movement would be repeated with a series of loud clicks until such time as the jamming of cable 80 has been cleared.

In this particular embodiment the top wall 15 is extended forwardly to overlay platform 19, said extended portion being provided with holes 160 to correspond with holes 21 in platform 19 for improved securing of the hitch member to housing 10. The cable opening is an elongate slot and a brush covering is provided therefor, which allows for substantial cleaning of the cable as it is wound into and out of the cable opening.

What is claimed is:

1. A winch for a vehicle comprising:
   (i) a winding cable;
   (ii) a drum rotatable about its axis for winding said cable;
   (iii) guide means for guiding said cable, said guide means being capable of motion relative to the winding surface of said drum for guiding the cable thereto;
   (iv) means for driving said guide means in a direction disposed in substantially spaced parallel relationship with said drum axis;
   (v) housing means enclosing said drum and having an opening for said cable extending in parallel to said drum, said opening having a length at least equal to the relative motion of the guide means; and
   (vi) coupling means at an end of said winding cable, said coupling means including a portion which locates and nests in a nesting portion integral with said housing, within and in communication with said opening, said nesting portion and coupling means portion being juxtaposed when the cable is in its fully wound position;
   (vii) the drum and the guide means being constructed and arranged such that the guide means is juxtaposed with the nesting portion at the point when the coupling means nests with the nesting portion.

2. A winch as claimed in claim 1 wherein the guide means is carried by a threaded rod whereby rotation of the rod produces movement of said guide member therealong, the arrangement being such that one rotation of the drum moves the guide means relative to the surface of the drum by a distance equivalent to at least one cable width, thereby providing an even lay of cable on the drum.

3. A winch as claimed in claim 1 wherein the housing has an elongate slot juxtaposed said guide means.

4. A winch as claimed in claim 1 further including motor means for driving said drum, said motor means including a gear train and clutch means, the gear train being wholly disposed within the confines of the drum.

5. A winch as claimed in claim 1, further including motor means for driving said drum, wherein said motor means is an electric motor, and a stator is mounted directly within a barrel of the winch drum, thereby eliminating the need for a separate motor housing.

6. A winch as claimed in claim 1, wherein the nesting portion of the coupling means and the nesting portion in the housing are each provided with tapered surfaces which on mating locate respective apertures to receive a securing pin.

* * * * *